UNITED STATES PATENT OFFICE.

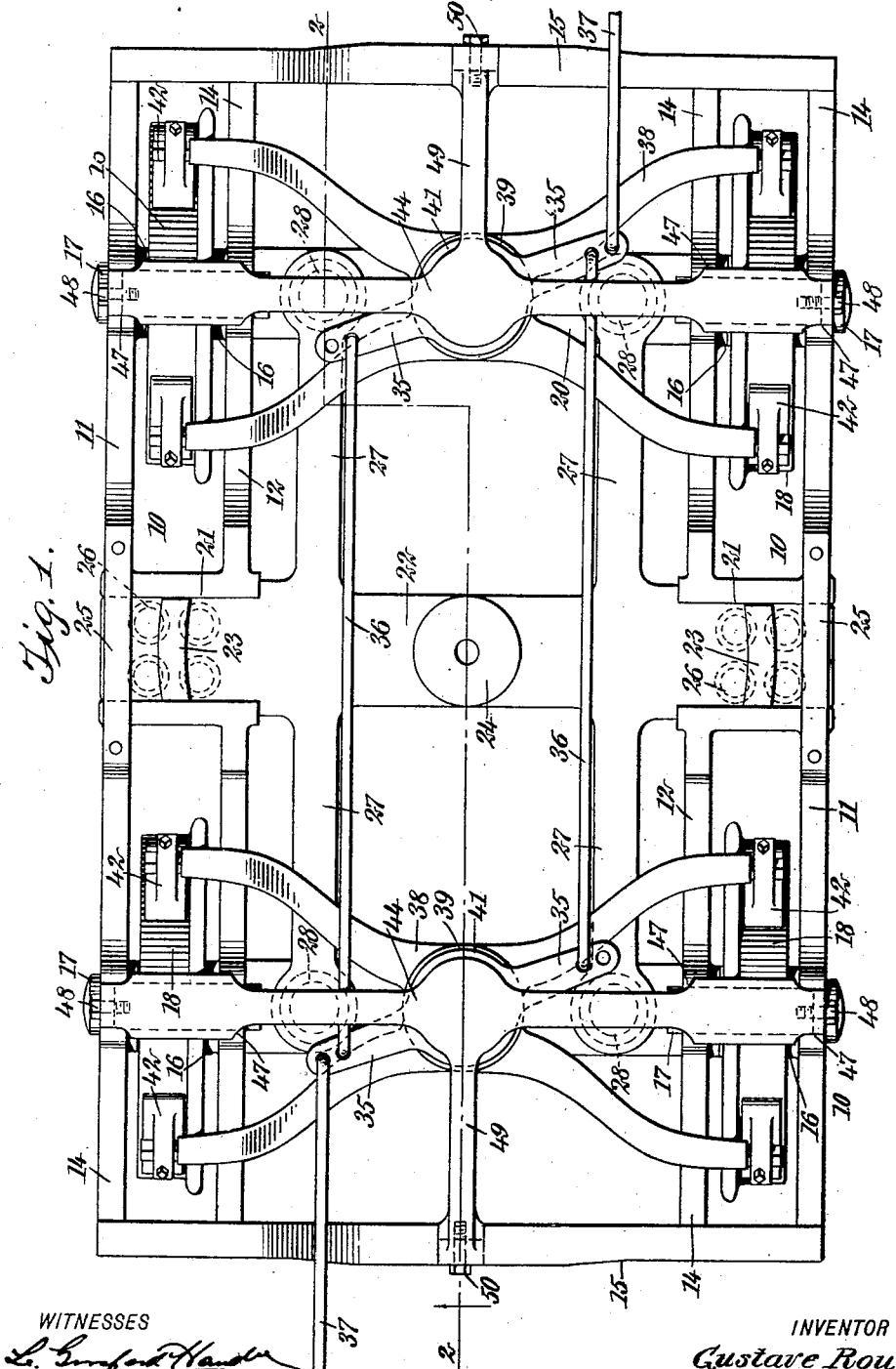

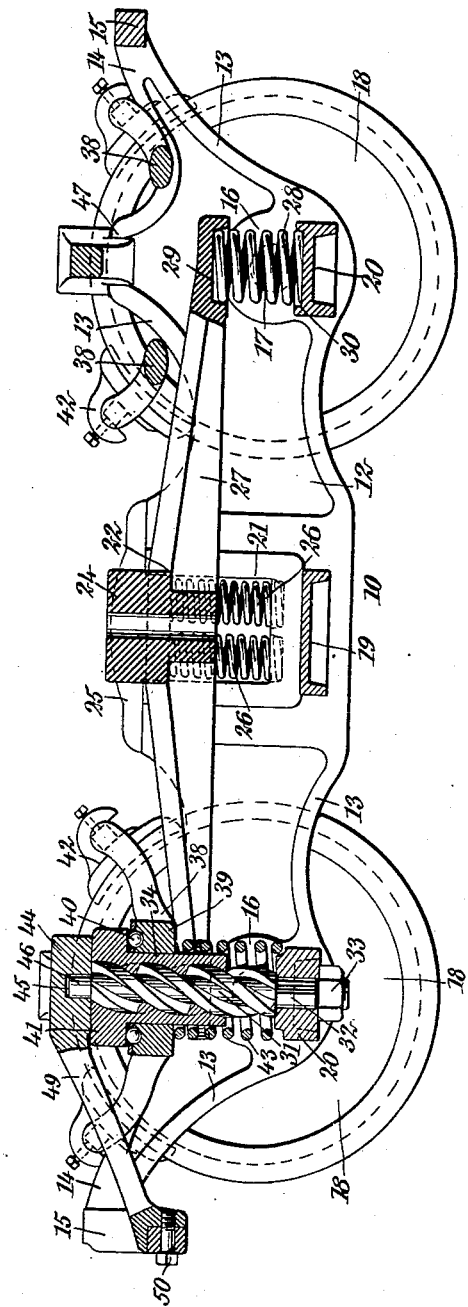

GUSTAVE ROUY, OF NEW YORK, N. Y.

CAR-TRUCK.

No. 907,528.　　　　Specification of Letters Patent.　　　　Patented Dec. 22, 1908.

Application filed May 29, 1908.　Serial No. 435,612.

*To all whom it may concern:*

Be it known that I, GUSTAVE ROUY, a citizen of the United States, and a resident of the city of New York, borough of Manhattan, in the county and State of New York, have invented a new and Improved Car-Truck, of which the following is a full, clear, and exact description.

This invention relates to car trucks and constitutes an improvement upon the car truck and brake as disclosed in my United States Patent No. 764,770, of July 12, 1904.

More particularly, the invention relates to a car truck which comprises pairs of spaced, longitudinal frame members, the wheels being mounted between the members of the pairs, a center cross frame joining the pairs of longitudinal frame members, a bolster having its ends resiliently supported in sockets formed by the longitudinal frame members, cross frames supporting screw posts for controlling the brake mechanism, end pieces joining the extremities of the pairs of longitudinal frame members, transoms secured to the longitudinal frame members and forming bearings for the upper ends of the posts, the transoms having arms secured to the end pieces, and arms rigid with the bolster and resiliently supported upon the cross frames.

An object of the invention is to provide a simple, strong and durable truck for railway or other cars having my special truck mechanism applied thereto, and so constructed that the parts of the truck mechanism are rigidly held and braced.

A further object of the invention is to provide a car truck having screw posts controlling the brake beams which carry the brake shoes, cross frames and transoms forming supports for the screw posts, the transoms serving rigidly to brace the frame, and a bolster resiliently supported by the longitudinal frame members of the truck and the cross frames.

The invention consists in the construction and combination of parts to be more fully described hereinafter and particularly set forth in the claims.

Reference is to be had to the accompanying drawings, forming a part of this specification, in which similar characters of reference indicate corresponding parts in both views, and in which Figure 1 is a plan view of one form of my improved car truck; and Fig. 2 is a longitudinal section on the line 2—2 of Fig. 1.

Before proceeding to a more detailed explanation of my invention, it should be clearly understood that the improved form of my invention is particularly useful in connection with my brake mechanism which comprises screw posts carried by the truck frame, suitably formed threaded members movable longitudinally of the posts when turned in one direction or the other, springs for holding the members in normal positions, brake beams controlled by the members and carrying brake shoes adapted to engage the wheel rims when the brake beams are actuated, and brake rods for rotating the members to operate the brake beams. The screw posts are firmly mounted upon and supported by the cross frames and transoms of the truck, and the latter at the same time serve to brace the truck frame, carrying rigid arms connected to the end pieces of the frame and having their extremities supported by the longitudinal frame members. I provide a bolster which is resiliently supported by the longitudinal frame members of the truck and has rigid arms extending laterally, and also resiliently supported upon the cross frames which form the lower supports for the screw posts.

The frame of the car truck may be fashioned from separate pieces bolted, riveted or otherwise rigidly secured together, or certain parts of it may be formed integral, for example, by being cast in one piece.

Referring more particularly to the drawings, I employ longitudinal frame members 10 each comprising an outer wheel frame 11 and an inner wheel frame 12. These preferably have at the edges strengthening ribs or flanges 13 and have at the ends upwardly disposed parts 14, at the extremities at which the end pieces 15 of the frame are secured. The inner and outer wheel frames are provided with bearings 16 in which are journaled short axles 17 each carrying one of the wheels 18. The latter are of any preferred or common form usually employed in car trucks, and if so desired may be provided with roller or ball bearings. It will be understood that each wheel is mounted upon a separate axle 16 and thus the wheels are all independent of each other.

The inner wheel frames are connected by a central cross frame 19 and near the ends by cross frames 20. The cross frames may be of any suitable form, as is shown for example, in the shape of inverted channels having strengthening ribs or flanges. They may be secured to the inner wheel frames by means of rivets or bolts or may be formed integral therewith. Adjacent to the ends of the center cross frame 19, the inner and outer wheel frames have integral sockets, which receive the ends of a bolster 22 by means of which the truck carries the car body in the usual fashion. At the ends of the bolster are the customary guide ribs 23, and it is provided with a central boss or hub 24. Keepers 25 extend across the open sockets and serve to secure the ends of the bolster in place. The latter are supported upon helical springs 26 arranged within the sockets and resting upon the bottom of the same. The bolster has pairs of oppositely extending and laterally disposed arms 27 which project over the cross frames 20 and have the ends supported by helical springs 28. At the extremities are formed sockets 29 which receive the helical springs 28. The cross frames also have sockets 30 in which the springs 28 are mounted, as is shown most clearly in Fig. 2. Screw posts 31 having the lower ends 32 of angular cross section are mounted upon the cross frames 20 which have openings of angular section to receive the ends 32. At the under side of the cross frames the ends 32 are threaded and receive retaining nuts 33. Suitably formed threaded members 34 are arranged upon the posts and are movable longitudinally thereof when the members are turned in one direction or the other. The members have heads 41 and laterally extending arms 35 connected by rods 36 so that they are constrained to operate together. Brake rods 37 of any preferred or common form are secured to certain of the arms and control the operation thereof. Brake beams 38 having central hubs 39 are movably mounted by means of the latter upon the members 34. The hubs 39 are provided with ball races in which are arranged ball bearings 40 engaging at the under sides of the heads 41 of the members 34. The brake beams have the extremities bifurcated and provided with brake shoes 42 of any preferred or common form and adapted to engage at the rims of the wheels. Helical springs 43 are arranged about the screw posts and the members 34. They are supported upon the cross frames 20 and engage at the under sides of the hubs 39 of the brake beams and thereby tend to hold the same in normal elevated positions.

I provide transoms 44 extending transversely of the frame and having at the under sides substantially central recesses 45 arranged to receive the suitably formed upper ends 46 of the screw posts. At the ends, the transoms have downwardly disposed parts arranged to seat in sockets 47 of the inner and outer wheel frames. They may be secured in position in any suitable manner, for example, by means of screws or bolts 48. The end pieces 15 of the truck frame have the centers preferably downwardly disposed and have secured thereto the ends of arms 49 rigid with the transoms and preferably downwardly inclined. The ends of the arms 49 are secured to the end pieces by means of screws or bolts 50, or in any other suitable manner.

Having thus described my invention, I claim as new, and desire to secure by Letters Patent:

1. In a car truck, longitudinal frames having sockets, cross frames connecting said longitudinal frames, and a bolster having the ends supported in said sockets and provided with arms supported by said cross frames.

2. In a car truck, longitudinal frames having intermediate the ends, sockets, cross frames connecting said longitudinal frames at both sides of said sockets, and a bolster having the ends resiliently supported in said sockets and provided with laterally extending arms resiliently supported by said cross frames.

3. In a car truck, pairs of spaced longitudinal frames, each pair of said frames having a socket, cross frames rigidly connecting said pairs of longitudinal frames, a bolster, means for resiliently mounting the ends of said bolster in said sockets, said bolster having pairs of laterally extending arms, and means for resiliently mounting each of said arms upon one of said cross frames.

4. In a car truck, longitudinal frames, end pieces joining the extremities of said frames, cross frames connecting said longitudinal frames intermediate the ends of the latter and adapted to carry controlling posts, and transoms connecting said longitudinal frames and supporting the controlling posts at the upper ends thereof, said transoms having arms secured to said end pieces.

5. In a car truck, longitudinal frames, end pieces joining said frames at the extremities of the same, cross frames connecting said longitudinal frames intermediate the ends of said longitudinal frames and adapted to support controlling posts, transoms rigidly connecting said longitudinal frames and supporting the posts at the upper ends thereof, said transoms having rigid arms secured to said end pieces, and a bolster supported by said longitudinal frames and said cross frames.

6. In a car truck, longitudinal frames, end pieces joining said frames at the extremities of the same, cross frames connecting said longitudinal frames intermediate the ends of said longitudinal frames and adapted to support controlling posts, transoms rigidly connecting said longitudinal frames and supporting the posts at the upper ends thereof, said transoms having rigid arms secured to said end pieces, said longitudinal frames having sockets intermediate their ends, and a bolster having the ends resiliently supported in said sockets and provided with laterally extending rigid arms, said arms of said bolster being resiliently supported upon said cross frames.

7. In a car truck, pairs of spaced longitudinal frames, each pair of said frames having a socket, cross frames rigidly connecting said pairs of longitudinal frames, a center cross frame rigidly connecting said longitudinal frames intermediate said cross frames, end pieces joining said longitudinal frames at the extremities of the same, said cross frames being adapted to support controlling posts, transoms rigidly connecting said longitudinal frames and supporting the posts at the upper ends thereof, said transoms having rigid arms secured to said end pieces, said longitudinal frames having opposite sockets, a bolster, means for resiliently supporting the ends of said bolster in said sockets, said bolster having pairs of oppositely disposed laterally extending arms, and means for rigidly supporting said arms of said bolster upon said cross frames.

8. In a car truck, pairs of spaced longitudinal frames, cross frames rigidly connecting said pairs of longitudinal frames, wheels rotatably mounted between the longitudinal frames of each of said pairs, and transoms rigidly connecting all of said longitudinal frames.

9. In a car truck, pairs of spaced longitudinal frames, cross frames rigidly connecting said pairs of longitudinal frames, said longitudinal frames having bearings, wheels journaled between the longitudinal frames of each pair in said bearings, and transoms, each having downwardly disposed parts, said longitudinal frames having sockets formed to receive said downwardly disposed parts of said transoms.

10. In a car truck, longitudinal frames, end pieces connecting said longitudinal frames, and transoms connecting said longitudinal frames, said transoms having arms rigidly secured to said end pieces.

11. In a car truck, longitudinal frames, end pieces rigidly connecting the extremities of said longitudinal frames and having the central portions downwardly disposed, and transoms rigidly connecting said longitudinal frames, said transoms having downwardly inclined rigid arms secured to said end pieces at the downwardly disposed parts of the same.

12. In a car truck, pairs of spaced longitudinal frames, end pieces rigidly connecting the extremities of all of said frames, cross frames connecting said longitudinal frames, transoms rigidly connecting all of said longitudinal frames, said transoms having rigid arms secured to said end pieces respectively, and wheels journaled between the longitudinal frames of said pairs.

In testimony whereof I have signed my name to this specification in the presence of two subscribing witnesses.

GUSTAVE ROUY.

Witnesses:
JOHN K. BRACHVOGEL,
JOHN P. DAVIS.